United States Patent

Hoover

Patent Number: 5,885,520
Date of Patent: Mar. 23, 1999

[54] APPARATUS FOR DISCHARGING MOLTEN METAL IN A CASTING DEVICE AND METHOD OF USE

[75] Inventor: Donald B. Hoover, York, Pa.

[73] Assignee: Baker Refractories, York, Pa.

[21] Appl. No.: 950,419

[22] Filed: Oct. 24, 1997

Related U.S. Application Data

[63] Continuation of Ser. No. 432,708, May 2, 1995, abandoned.

[51] Int. Cl.$^6$ ........................................................ C21B 7/12
[52] U.S. Cl. ............................ 266/45; 266/286; 222/606; 501/99; 501/108
[58] Field of Search ................................ 266/236, 286, 266/45; 222/597, 606, 607; 501/108, 121, 122, 99

[56] References Cited

U.S. PATENT DOCUMENTS

| | | | |
|---|---|---|---|
| 1,674,961 | 6/1928 | Diamond | 266/280 |
| 1,743,803 | 1/1930 | Arensberg et al. | 266/280 |
| 3,030,228 | 4/1962 | Hernandez et al. | 117/70 |
| 3,162,607 | 12/1964 | Burbidge et al. | 252/477 |
| 3,176,054 | 3/1965 | Homestead et al. | 264/44 |
| 3,215,546 | 11/1965 | Wilson et al. | 106/56 |
| 3,224,888 | 12/1965 | Metz | 106/56 |
| 3,233,017 | 2/1966 | Weaver et al. | 264/63 |
| 3,256,104 | 6/1966 | Weaver | 106/55 |
| 3,265,513 | 8/1966 | Tidridge et al. | 106/56 |
| 3,416,935 | 12/1968 | Einstein et al. | 106/41 |
| 3,448,974 | 6/1969 | Sarraf | 266/280 |
| 3,717,602 | 2/1973 | Koch et al. | 260/28 |
| 3,883,359 | 5/1975 | Harvey | 106/64 |
| 4,007,049 | 2/1977 | Rossi et al. | 106/58 |
| 4,049,461 | 9/1977 | Mortl et al. | 106/56 |
| 4,189,130 | 2/1980 | Watanabe et al. | 266/270 |
| 4,192,687 | 3/1980 | Bade . | |
| 4,208,214 | 6/1980 | Stein et al. | 106/56 |
| 4,221,596 | 9/1980 | Rice | 106/69 |
| 4,255,197 | 3/1981 | Peralta et al. | 106/41 |
| 4,282,173 | 8/1981 | Ochiai et al. | 264/59 |
| 4,303,448 | 12/1981 | Palmour, III et al. | 501/127 |
| 4,318,996 | 3/1982 | Magder | 501/84 |
| 4,359,625 | 11/1982 | Okada et al. | 219/300 |
| 4,407,972 | 10/1983 | Brezny | 501/99 |
| 4,429,816 | 2/1984 | Thrower | 222/603 |
| 4,430,439 | 2/1984 | Kleeb | 501/95 |
| 4,454,239 | 6/1984 | Cassens, Jr. | 501/99 |
| 4,461,843 | 7/1984 | McGarry et al. | 501/102 |

(List continued on next page.)

FOREIGN PATENT DOCUMENTS

| | | | |
|---|---|---|---|
| 12 98 276 B | 6/1969 | Germany . | |
| 1141663 | 6/1986 | Japan | 222/606 |
| 61-44836 | 10/1986 | Japan . | |
| 1020441 | 2/1966 | United Kingdom . | |

OTHER PUBLICATIONS

*Patent Abstracts of Japan;* Abstract of Japanese Publication No. JP 03 205349 A, Sep. 1991.
*Patent Abstracts of Japan;* Abstract of Japanese Publication No. JP 02 180753 A, Jul. 1990.

*Primary Examiner*—Scott Kastler
*Attorney, Agent, or Firm*—Bacon & Thomas

[57] ABSTRACT

A nozzle or tube which is useful for pouring molten metal, especially aluminum killed molten steel. The nozzle is formed from a blend of doloma and graphite which is bonded together in a carbonized matrix. Nozzles or tubes made in accordance with this invention have enhanced thermal shock resistance. Furthermore, the nozzles or tubes of this invention resist the formation of aluminum oxide therein when they are used for pouring molten aluminum killed steel. Consequently, these tubes or nozzles can be used in a continuous casting process for a long period of time without having to periodically stop the procedure and change the tubes as they become blocked with aluminum oxide. As a result of the thermal shock resistance, the usual preheating step prior to contacting the nozzle with the molten metal is greatly reduced.

36 Claims, 2 Drawing Sheets

U.S. PATENT DOCUMENTS

| | | | |
|---|---|---|---|
| 4,510,191 | 4/1985 | Kagami et al. | 428/36 |
| 4,549,677 | 10/1985 | Marino et al. | 222/591 |
| 4,568,007 | 2/1986 | Fishler | 222/606 |
| 4,682,717 | 7/1987 | Marino et al. | 222/591 |
| 4,682,718 | 7/1987 | Watanabe et al. | 222/591 |
| 4,730,754 | 3/1988 | Buhr et al. | 222/606 |
| 4,795,725 | 1/1989 | Addink et al. | 501/101 |
| 4,972,900 | 11/1990 | Szczypiorski | 164/481 |
| 5,046,647 | 9/1991 | Kawai et al. | 222/606 |
| 5,060,831 | 10/1991 | Fishler et al. | 222/591 |
| 5,083,687 | 1/1992 | Saito et al. | 222/606 |
| 5,124,288 | 6/1992 | Ishikawa et al. | 501/108 |
| 5,185,300 | 2/1993 | Hoggard et al. | 501/99 |
| 5,198,126 | 3/1993 | Lee | 222/606 |
| 5,244,130 | 9/1993 | Ozeki et al. | 222/606 |
| 5,348,202 | 9/1994 | Lee | 222/606 |
| 5,369,066 | 11/1994 | Furuta et al. | 501/108 |
| 5,403,794 | 4/1995 | Morris et al. | 501/105 | so-called porous type nozzles, can also be cast or formed by isostatic pressing methods into the shape of a tube.

APPARATUS FOR DISCHARGING MOLTEN METAL IN A CASTING DEVICE AND METHOD OF USE

This application is a Continuation of application Ser. No. 08/432,708, filed May 2, 1995, now abandoned.

BACKGROUND OF THE INVENTION

1. Field of the Invention

The present invention relates to the art of casting aluminum killed molten steel and related ferrous alloys. The invention is directed toward tubes such as casting shrouds, nozzles (including submerged entry nozzles and submerged entry shrouds) and the like through which the molten metal passes during a continuous casting process. Typically these tubes are used in a continuous casting process for pouring the molten metal from a ladle into a tundish or from a tundish into a casting mold. The tubes of the present invention are made from a composition which is effective in preventing the deposition of non-metallic inclusions, especially alumina ($Al_2O_3$), on the interior surface of the tube as the metal passes therethrough. In addition, the tubes made from this material also have a surprising thermal shock resistance. The invention is more particularly directed toward submerged entry nozzles and submerged entry shrouds which resist clogging caused by the deposition of aluminum oxide therein and which also have a surprising thermal shock resistance.

2. Background Information

It is well known that aluminum metal or alloys thereof may be added to molten steel in order to remove dissolved oxygen. The aluminum removes the oxygen from the steel by reacting with the oxygen to produce solid $Al_2O_3$, most of which floats to the top of the molten steel where it can be easily removed. However, a small amount of $Al_2O_3$ remains in the steel. The $Al_2O_3$ which remains in the steel is known to accumulate and form a deposit on the inner surface of casting shrouds and nozzles as the molten metal passes therethrough. Although the reasons for this phenomenon are not completely understood, it is believed that the deposition occurs due to the presence of alumina in the refractory material of the nozzle which comes in contact with the molten steel containing residual alumina from the aluminum killing process.

The deposition of alumina is particularly troublesome in the nozzles and shrouds associated with a tundish which is used in a continuous casting process. In this type of process, the molten steel is teemed from a ladle through a nozzle or shroud into a tundish. The tundish includes a plurality of holes in the bottom which are connected to nozzles for the flow of molten steel therethrough into the casting machine. In order to accomplish this objective, it is important that the nozzles be able to provide a regular flow of molten metal to the casting machine. Typically, such casting machines operate at a specific casting rate. Obviously, it is important that the supply of molten metal which flows through the nozzles to the casting machine must remain as constant as possible during the casting procedure. Thus, nozzles which become partially or wholly occluded due to the deposition of alumina within the bore of the nozzle will cause serious problems in the casting procedure.

Various techniques are known in the prior art for avoiding the above-noted clogging problems. However, none of these have been totally satisfactory for a variety of reasons. For example, it is known in the art to provide a nozzle with a plurality of openings in the internal surface for the passage of an inert gas into the bore while the metal is flowing therethrough. In operation, gas is injected through these openings into the bore and this gas minimizes contact between the molten metal and the nozzle surface, thus preventing interaction between the metal and the nozzle which, in turn, prevents clogging from taking place. Typically, the openings constitute a highly porous surface which may be in the form of a porous sleeve within the bore of the nozzle. A nozzle of this type must include a complex and costly internal structure in order for the inert gas to reach the openings or pores within the internal portion of the nozzle. Thus, the manufacturing steps and costs associated with such a nozzle make this type of nozzle undesirable. In addition, the use of such nozzles is known to produce defects such as pinholes in the steel product due to the large amount of inert gas which is required to avoid the clogging problem.

Another approach to solve the clogging problem involves the fabrication of the nozzle from a material which inherently does not interact with the molten metal to form deposits of alumina. However, there are only a limited number of materials which are capable of functioning in this manner and which have the refractory properties which are needed in the environment of the molten metal casting apparatus. In particular, it is difficult to find a material which has the required thermal shock resistance needed for nozzles and the like through which molten metal flows.

U.S. Pat. Nos. 5,244,130; 5,046,647; 5,060,831 and 5,083,687 disclose various types of materials which are used to make nozzles and the like for casting molten metal. The specifications of each of the above-noted patents are incorporated herein by reference.

U.S. Pat. No. 5,244,130 (Ozeki et al.) provides an improved nozzle which is said to overcome the problems associated with other prior art nozzles. Ozeki et al. mention two types of prior art nozzles over which their invention is said to be an improvement. The first prior art nozzle is made from graphite and calcium zirconate (zirconia clinker) containing 23%–36% CaO. Ozeki et al. mention that the calcium oxide contained in the calcium zirconate does not sufficiently move toward the surface of the nozzle bore through which the steel flows and consequently the calcium oxide does not come into sufficient contact with the nonmetallic inclusions such as α-alumina, and for this reason, this prior art nozzle is not effective in preventing the accumulation and deposition of alumina within the nozzle.

The second type of prior art nozzle discussed in U.S. Pat. No. 5,244,130 is similar to the first, but additionally includes calcium metasilicate ($CaO.SiO_2$). It is said the that presence of the calcium metasilicate in the second type of prior art nozzle overcomes the problems noted with respect to the first type of prior art nozzle due to the combined effects of calcium zirconate and calcium metasilicate which allows the calcium oxide in each particle of zirconia clinker to move toward the surface. However, Ozeki et al. also note with respect to the second type of prior art nozzle that the calcium metasilicate has a low content of calcium oxide which is insufficient to adequately replenish the calcium oxide which reacts with the alumina in the molten steel; thus making it impossible to prevent clogging of the nozzle for a long period of time. In order to overcome this problem, Ozeki et al. use crystal stabilized calcium silicate ($2CaO.SiO_2$ and $3CaO.SiO_2$).

The nozzles disclosed by Ozeki et al. include graphite in the amount of 10–35 wt. % which is added to improve oxide resistance, wetting resistance against molten steel and to increase thermal conductivity. Graphite in amounts which exceed 35% are avoided since such large amounts of graphite degrade corrosion resistance. There is no suggestion for adding flake graphite to improve the thermal shock resistance which is not surprising since the zirconia clinker used by Ozeki et al. is said to have a low thermal expansion coefficient.

U.S. Pat. No. 5,083,687 (Saito et al.) provides an improved nozzle for overcoming the above-noted clogging problem. Saito et al. mention that one type of prior art nozzle which was designed to avoid the clogging problem uses an inner lining made from a material containing 90–50 wt. % MgO and 10–50 wt. % C. However, it is noted in the specification that such materials containing graphite (C) and MgO suffer from cracking due to a large thermal expansion coefficient as compared to conventional nozzles made from alumina and graphite. Saito et al. also note that nozzles containing MgO and C exhibit inferior anti-spalling. In view of these undesirable features associated with refractories containing MgO and carbon, particularly the poor thermal shock resistance associated with the presence of MgO in the composition, Saito et al. concluded that nozzles which includes these ingredients would be unacceptable. Thus, Saito et al. avoid any material which contains MgO as a material for making the nozzle. Instead, they use a composition containing boron nitride, zirconium oxide and a sintering assistant containing SiC and $B_4C$.

U.S. Pat. No. 5,046,647 (Kawai et al.) discloses two types of improved nozzles for dealing with the clogging problem. One nozzle is made from $ZrO_2$, C and $SiO_2$. Kawai et al. emphasize that CaO and MgO should be avoided, or at best, can be tolerated in small amounts so that the sum of CaO and MgO is less than 1%. Kawai et al. also describe a second type of nozzle containing CaO and $SiO_2$ in which the ratio of CaO to $SiO_2$ is limited to 0.18 to 1.86. No MgO is disclosed for use in this second type of nozzle which is not surprising in view of the lack of thermal shock resistance noted in the prior art when MgO is included in the composition of the nozzle.

U.S. Pat. No. 5,060,831 (Fishler et al.) discloses a material for covering a casting shroud such as a tundish nozzle used for casting steel. The composition includes CaO and a zirconium oxide carrier. There is no suggestion for including MgO in the composition.

SUMMARY OF THE INVENTION

It is an object of the present invention to provide a casting element such as a nozzle or the like which does not become clogged with alumina when used in a process for casting aluminum killed ferrous metal alloy, especially aluminum killed steel.

It is a further object of this invention to provide a casting element such as a nozzle or the like which combines the aforementioned clogging resistance with enhanced thermal shock resistance.

It is a further object of the present invention to provide a method for casting aluminum killed ferrous metal, especially aluminum killed steel which utilizes the casting element of the present invention.

These and other objectives are accomplished by providing a tubular casting element containing doloma (i.e., doloma or CaO.MgO) and flake graphite in a carbon matrix or network derived from a binder resin by heating the resin under carbonizing conditions. It has been discovered that tubular casting elements such as a nozzle made from the above material avoids the clogging problem. In addition, it has also been discovered that the selection of doloma as the refractory material for such casting elements combined with flake graphite results in a casting element having highly desirable thermal shock resistance so that the molten metal can flow through the casting element without cracking with a minimum or absence of preheating of the casting element being necessary. The thermal shock resistance obtained with the dolomite refractory is surprising in view of the prior art observation that nozzles which include MgO have an unacceptable level of thermal shock resistance which causes them to crack when used in a casting process.

Although the present invention is more particularly directed to nozzles used in continuous casting procedures, the invention is not limited to such nozzles but is more generally applicable to any tube or the like through which molten metal flows and which is susceptible to clogging as described above. Thus, while the following descriptive material refers to nozzles used in casting procedures, it will be understood that the description applies equally well to related devices which are susceptible to the aforementioned clogging problem.

DETAILED DESCRIPTION OF THE INVENTION AND PREFERRED EMBODIMENTS

Figure 1:
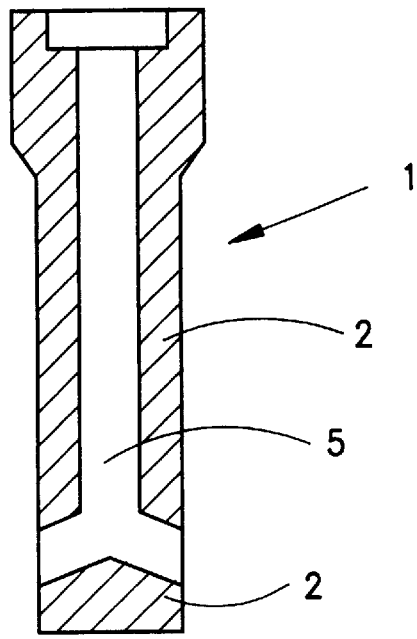
FIG. 1 is a sectional view illustrating an embodiment of the nozzle of the present invention.

The nozzles of the present invention are made by substituting doloma/graphite in place of the $Al_2O_3$/graphite used in prior art nozzles. It has been discovered that the doloma (doloma) avoids the clogging problem associated with alumina/graphite tubes because the dolomite causes the production of soluble reaction products which do not clog the nozzle. Doloma is a well known and commercially available refractory material which is currently used for a variety of refractory applications due to its heat resistant capability. It is made by calcining dolomite to convert the $MgCO_3$ to MgO and the $CaCO_3$ to CaO. Sintering is then performed on the dolomite to densify the grain. Typically, the calcined doloma is sold in pulverized form which can be shaped into a variety of structures.

The nozzles of the present invention are made by mixing doloma powder with graphite, preferably flake graphite, with sufficient liquid resin binder to form agglomerates. Generally, 9–13% by weight, preferably about 9½–10½% by weight of liquid resin binder (based on the weight of the solids blend) is sufficient to form agglomerates in the mixing process.

The agglomerates are pressed isostatically in a mold at ambient temperature to shape the material into the desired form. The shaped mass is baked in a curing oven where the temperature is gradually increased to harden (cure) the resin. Next the formed mass is carbonized (coked) in a furnace at a carbonizing temperature greater than 850° C. (e.g., 1800°–2400° F.) in an inert gaseous atmosphere which is unreactive with the resin (e.g., nitrogen or argon) to fully carbonize the resin and form a carbon network or matrix which holds the doloma and graphite together.

Resins which have sufficient green strength to bind the refractory materials and which can be carbonized to form a carbon network are well known to those skilled in the art. Many synthetic resins are known to be useful for forming refractory materials such as nozzles and can be used in the present invention. In general, it is known that these resins form a carbon network after the carbonizing or coking step. The carbon network holds the article together so that it resists breaking. Thus, the amount of resin should be enough to provide a sufficient amount of carbon network to accomplish this well known objective. Excessive amounts of carbon network should be avoided. Thus, it is preferable that the amount of carbon network should be no more than the amount which is required to hold the finished article together so that it resists breaking. Generally, the carbon network constitutes 4–7 wt. % of the finished nozzle, preferably about 5–6% (e.g., 6%).

If solid resin is used, it should be dissolved in a solvent to form a liquid binding resin composition. Typically, resins which are known for use in forming nozzles have a high coking value in the range of about 45% –50% to produce sufficient carbon network after carbonization. Also, curing the resin should avoid a condensation reaction since the water produced by such a reaction would be expected to react with the calcium oxide in the dolomite to produce the corresponding hydroxide which occupies a higher volume and thereby causes the structure to come apart. Thus, resins which are known for use with other calcium oxide containing refractory materials can be used in the present invention. The binding resin will produce a carbon network after the carbonizing or coking step which is sufficient so that the nozzle resists breaking. It is known that some weight loss of the resin occurs during the carbonization step. This weight loss results in some open porosity. Ideally, the weight loss which accompanies the thermal treatments does not result in an open porosity greater than 16%.

A preferred resin is phenol-formaldehyde resin. Such resins are well known and are produced by the reaction of phenol and formaldehyde. Preferably, the resin system contains formaldehyde and phenol in a ratio of 0.85 formaldehyde to phenol. The reaction between the phenol and formaldehyde is normally acid catalyzed so that the resulting resin must be buffered, dewatered and have the free phenol adjusted. The preferred levels are pH about 7.0, water below 0.1% and free phenol between 0.2–0.9%. The resin should then be put into solution with solvent. Suitable solvents include primary alcohols such as methyl, ethyl, isopropyl and furfuryl alcohol; glycol such as ethylene glycol; ketones such as methyl ethyl ketone and methyl isobutyl ketone; aldehyde such as furfuraldehyde and acetaldehyde; dibasic esters and dimethyl formamide. Preferably the solvent is a furan compound, preferably furfuraldehyde or a solution of furfuryl alcohol and furfuraldehyde. In practice, the resin solution includes a basic co-reactant such as triethylene tetrarine, diethylene tetramine, ethylene diamine or tetraethylene pentamine. Other suitable co-reactants include diamines having an amine value of 1000±100 and the equivalent molecular weight of 30±2.

As an alternative to the B staged phenolic novolak-furfural solution, the invention may use a phenolic novolak dissolved in glycol and methyl alcohol but this resin is less desirable.

Another alternative binder system involves the use of furfural and a powdered phenolformaldehyde resin, mixed until the furfural picks up the solid, powdered resin and the resulting plasticized resin then causes the raw materials to roll up into agglomerates. A tumble dryer is subsequently used to densify the agglomerates. This process results in agglomerates with excellent properties.

The graphite used is preferably natural flake graphite with a carbon content of not less than about 94%. Preferably the flake size should be described by a normal may be tolerated in the graphite, it is preferable to minimize such impurities. Preferably the graphite should be substantially free from contaminates and residual flotation compounds and the water content should be less than 0.5%. An analysis of a preferred flake graphite is shown in Table 1.

TABLE 1

| Specie | Wt. % |
| --- | --- |
| Carbon | 95 ± 1 |
| CaO | 0.15 |
| MgO | 0.06 |
| $Al_2O_3$ | 0.87 |
| $SiO_2$ | 2.7 |
| $Fe_2O_3$ | 1.0 |
| Other | 0.22 |

The graphite is in the form of a powder so that it can form agglomerates with the doloma powder and resin and so that these agglomerates can then be molded into a fixed shape for carbonization. Preferably the particles are 0.044–0.3mm in diameter.

The doloma is also in the form of a powder which can form agglomerates with the graphite and resin. Preferably the doloma is small enough to pass through a 14 mesh screen and large enough to be held on a 100 mesh screen (U.S. standard mesh). However, when screening the doloma to obtain the appropriate size range for this invention, it is not absolutely necessary to remove all of the material which would pass through the 100 mesh screen. For example, it is acceptable to include up to about 10 wt. % of the fines which would eventually pass through the 100 mesh screen if the screening process were continued for a very long period of time. In addition, doloma ball mill fines may also be included. Ball mill fines are small enough to pass through a 325 U.S. standard mesh and can be defined as particles having a surface area-to-weight ratio of 2300 $Cm^2$/gm to 2800 $Cm^2$/gm. A suitable doloma is a powder having particles ranging in size from 0.15 mm to 1.4 mm in diameter and which may further include doloma ball mill fines. Minor amounts of impurities may be tolerated in the dolomite. However, it is preferable to minimize such impurities. Preferably, the doloma should contain a minimum of 56.5% CaO, 41.5% MgO and a maximum of 2% other impurities with a maximum of 1% $Fe_2O_3$. An analysis of a preferred doloma is shown below in Table 2.

TABLE 2

| Specie | Wt. % |
| --- | --- |
| CaO | 56.7 |
| MgO | 41.2 |
| $Al_2O_3$ | 0.5 |
| $SiO_2$ | 0.4 |
| $Fe_2O_3$ | 1.2 |

Preferably the density of the doloma is from 3.25 to 3.28 grams/cubic centimeter. Thus, the doloma should be sintered until the bulk density of the grain is a minimum of 3.25 grams/cubic centimeter. Preferably the total porosity, open and closed, should not exceed 5%. The preferred particle size distribution of the doloma fraction contained in the nozzle is 150 microns–1300 microns with the ball mill fines having a statistical mean particle diameter of 7.2 microns. In another preferred embodiment, the doloma includes a fraction having a particle size range from 0.15 mm–1.4 mm in diameter (coarse fraction) and a ball mill fines fraction. In this preferred embodiment, the coarse fraction of doloma should be in the range from about 32 wt. % to about 43 wt. % with respect to the solids blend. The solids blend includes all the solid material (e.g., graphite and doloma) and excludes the resin, solvent and resin co-reactant. In this preferred embodiment, the ball mill fines fraction may range from 20–25 wt. % of the solids blend.

The solids blend used in the present invention may further include other oxides which are compatible with CaO and MgO. Such oxides include silica ($SiO_2$), zirconia ($ZrO_2$), hafnia ($HfO_2$), ceria ($CeO_2$), titania ($TiO_2$) and magnesia (MgO). These oxides should be below 25 wt. % of the solids blend, preferably no more than 10 wt. % and most preferably no more than 5 wt. %. The amount of MgO may exceed 1% (e.g., more than 1% up to 10% or more than 1% up to 5%). In addition, effective amounts of known antioxidants used in refractory nozzles may also be included in the solids blend. Suitable antioxidants can include the metal powders of aluminum, silicon, boron, calcium and magnesium or the carbides of silicon, calcium, zirconium, boron, tantalum and titanium. Some low melting oxides such as boric oxide, sodium borate or any combination of glass formers—aluminum, silicon, boron, phosphorous and zirconium oxides can be added to the body in order to form a protective layer on the surface to ban the ingress of oxygen into the body. This oxygen will destroy the bond carbon, and therefore, must be prevented from doing so by some barrier layer. The additions of metals or glass-forming oxides or carbides accomplish this. These materials are added in antioxidant effective amounts to protect the nozzle from oxidation particularly when the nozzle is hot.

The nozzles and related articles of this invention are made by conventional molding techniques. First, the solid blend containing the dolomite, graphite and optional metal oxide additives and optional antioxidant additives are mixed. Next, the resin is added to the dry solid blend and the ingredients are mixed in an agglomerating mixer to form agglomerates. Preferably the agglomerates have a normal size distribution centered around 400 microns with no agglomerates being greater than about 2000 microns and none being finer than about 150 microns. The agglomerates are formed in the mixing operation when the solids blend is wet blended with the resin. For example, in a preferred embodiment, the agglomerates are formed by wet mixing the solids blend with the resin solution along with the co-reactant. Densification of the agglomerates occurs during the mixing operation through viscosity enhancement of the resin which occurs when the volatile liquids evaporate and the resin and co-reactant react with each other. Preferably, the bulk density of the agglomerates should not be less than 1.65 grams/cubic centimeter, more preferably from 1.9–2.1 grams/cubic centimeter. Such agglomerates, when pressed at 10000 PSI, will form an article having a bulk density of 2.37–2.45 grams/cubic centimeter.

The agglomeration is best performed at ambient temperature with only a gradual and limited amount of warming which occurs due to the mixing and slight exothermic reaction which occurs as the resin cures. Preferably the material being agglomerated should not be allowed to exceed a temperature more than about 140° F. and the rate of temperature increase should be no more than about 3° F. per minute.

The agglomerates are placed in a mold (e.g., rubber mold) and formed at high pressure, e.g., 8500 PSI (580 bar) to 25000 PSI (1700 bar) to form the shaped structure having a bulk density in the range of 2.35–2.45 grams/cubic centimeter which is a preferred density for operation in a metal casting procedure. An isostatic press with rubber tooling may be used for the molding operation. After molding, the shaped structure is heated in the absence of oxygen (e.g., in an atmosphere of nitrogen or argon) at a high temperature (e.g., 975°–1375° C.) until the resin bond is converted to a carbon bond. The articles in this coked state will have the required physical characteristics to permit successful use as nozzles and the like for casting molten metal.

There may be wide variation in the amount and proportion of the solid materials which are used to form the nozzles and similar articles of this invention. Generally, the dolomite (including ball mill fines) can vary from 30–70% based upon the weight of the solids blend. Unless otherwise stated, all percentages given herein are percentages by weight.

There should be at least about 25 wt. % graphite in the solids blend. There is no upper limit to the amount of graphite as long as there is sufficient dolomite to avoid the clogging problem. However, it is preferred to limit the graphite to no more than 45% to avoid excessive erosion associated with nozzles containing a large amount of graphite. Thus, a preferred embodiment of this invention, the graphite can vary from about 25 wt. % to about 45 wt. % based upon the weight of the solids blend, more preferably about 30% to about 45% by weight. However, in order to combine the anticlogging advantage with the desired thermal shock resistance required for adequate performance, the graphite content should be greater than 33% (e.g., greater than 35%) to about 43%, preferably about 37–43% and most preferably about 38% and the doloma should be in the range of 37–63 wt. % based upon the weight of the solids blend.

The thermal shock resistance property of the nozzles of this invention is very significant since it allows the nozzles to be used without having to undergo an extensive and time consuming pre-warming procedure.

When molten steel which can vary from 2850°–3100° F. depending on the grade, hits a cooler tube, the interior of the tube begins to expand at a faster rate than the outer parts of the tube. This generates a tensile "hoop stress" in the outer parts of the tube. The tube will crack if this stress exceeds the tensile fracture strength of the material. Air will be admitted to the steel stream when the tube cracks and this will result in unwanted oxidation.

A parameter which is used to evaluate thermal shock resistance is shown in the formula below:

$$R_{st} = \sqrt{\frac{G}{\alpha^2 E}}$$

In the above formula: G is the surface fracture energy; $\alpha$ is the linear coefficient of thermal expansion and E is Young's modulus which is the ratio of stress-to-strain in the elastic region of the stress-to-strain curve.

For the purposes of the present invention, adequate thermal shock resistance is achieved when the probability of failure (i.e., cracking) is below an acceptable level. FIG. 4 is a graph which shows the relationship between the probability of failure on the vertical axis and the $R_{st}$ value on the horizontal axis. For practical purposes, an acceptable thermal shock resistance is obtained when the $R_{st}$ value is about 25 or higher, since such $R_{st}$ values are associated with a probability of failure which is less than $10^{-2}$. Such values begin to be achieved when the graphite content is more than about 33% since it has been observed that when the graphite content is 33% with 62% doloma, the $R_{st}$ value is 24.6. There is a distinct improvement in the thermal shock resistance when the graphite level is greater than 35 wt. % of the solids blend.

The nozzles of the present invention may be formed entirely of the above described composition like the embodiment shown in FIG. 1. FIG. 1 shows a nozzle indicated generally by reference numeral 1. The entire nozzle is made from the refractory material of this invention which is shown by reference numeral 2.

Figure 2:
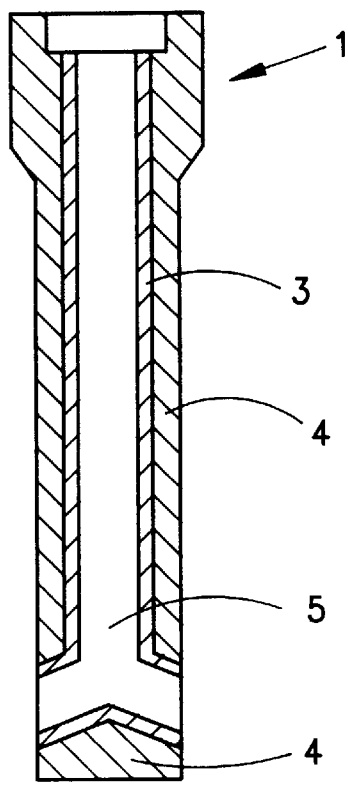
FIG. 2 is a vertical section illustrating another embodiment of the nozzle according to the present invention.

FIG. 2 shows an alternative embodiment wherein only the inner portion of the nozzle is made from the refractory material of this invention. Thus, FIG. 2 includes an inner lining 3 made from the refractory material of this invention while the outer material 4 may be less expensive material which does not come in contact with the molten metal. FIGS. 1 and 2 show an inner bore 5 within the nozzle for the passage of molten metal therethrough.

The following examples illustrate preferred embodiments of the invention which have acceptable thermal shock resistance values.

TABLE 3

|  | Example 1 | Example 2 | Example 3 | Example 4 | Example 5 | Example 6 |
|---|---|---|---|---|---|---|
| Graphite 0.3 mm–0.15 mm dia. | 38 | 30 | 38 | 30 | 45 | 38 |
| Graphite 0.15 mm–0.044 mm | 0 | 8 | 0 | 8 | 0 | 7 |
| Doloma 0.42 mm–0.15 mm | 7 | 7 | 37 | 37 | 0 | 12 |
| Doloma 1.4 mm–0.15 mm | 30 | 30 | 0 | 0 | 37 | 25 |
| Doloma Ball Mill Fines | 25 | 25 | 25 | 25 | 25 | 25 |
| Liquid Resin | 10 | 10 | 10 | 10 | 10 | 10 |
| Basic Coreactant | 1 | 1 | 1 | 1 | 1 | 1 |

Examples 1–6 were made from the compositions shown in Table 3 which shows the parts by weight for each ingredient used therein. In examples 1–6, the dry ingredients (graphite, doloma and ball mill fines) are dry mixed to form a blend which is then wet mixed with the resin and co-reactant. Mixing is continued to form agglomerates of the cured resin and solid particles. These agglomerates are placed in a rubber mold and formed at high pressure (e.g., 8500–25000 PSI). Next, these parts are then heated in the absence of oxygen until the resin is converted to a carbon bond. The parts in this coked state have desirable physical properties to permit successful use as pouring tubes. These properties are shown below in Table 4.

TABLE 4

|  | Example 1 | Example 2 | Example 3 | Example 4 | Example 5 | Example 6 |
|---|---|---|---|---|---|---|
| Bulk Density | 2.28 ± 0.05 | 2.29 ± 0.05 | 2.26 ± 0.06 | 2.26 ± 0.06 | 2.23 ± 0.05 | 2.20 ± 0.05 |
| Apparent Porosity | 15.4 ± 2% | 15.1 ± 2% | 16.1 ± 2% | 16.0 ± 2.0% | 16.3 ± 2.0% | 16.7 ± 2.0% |
| Room Temp. MOR (psi) | 700 ± 200 | 700 ± 200 | 600 ± 200 | 660 ± 200 | 600 ± 200 | 550 ± 100 |
| Rst | 38.1 | 36.4 | 36.4 | 35 | 41 | 40 |

All of the above examples have $R_{st}$ values well in excess of 25. However, lowering the amount of graphite from 38% of the solids blend to 33% of the solids blend results in an $R_{st}$ value of only 24.6 compared to an $P_{st}$ value of 38.5 when the amount of graphite is 38%. This distinction is illustrated by a comparison between the composites A and B formed by pressing and carbonizing the compositions shown below in Table 5 which indicates the parts by weight of each ingredient.

TABLE 5

|  | Example A | Example B |
|---|---|---|
| Graphite 0.3 mm–01.5 mm dia. | 38 | 33 |
| Doloma 1.4 mm–0.59 mm | 30 | 30 |
| Doloma 0.42 mm–0.15 mm | 7 | 12 |
| Doloma BMF | 25 | 25 |
| Resin | 10 | 10 |
| Coreactant | 1 | 1 |

The physical properties of the composites A and B are shown below in Table 6.

TABLE 6

|  | Example A | Example B |
|---|---|---|
| Coefficient of Thermal Expansion | $6.8 \times 10^{-6°}$ C.$^{-1}$ | $8.7 \times 10^{-6°}$ C.$^{-1}$ |
| Young's Modulus GPA | 1.65 | 2.33 |
| ½ $ó_f$ $ε_f$ | 119 | 107 |
| Rst | 38.5 | 24.6 |

Figure 3:
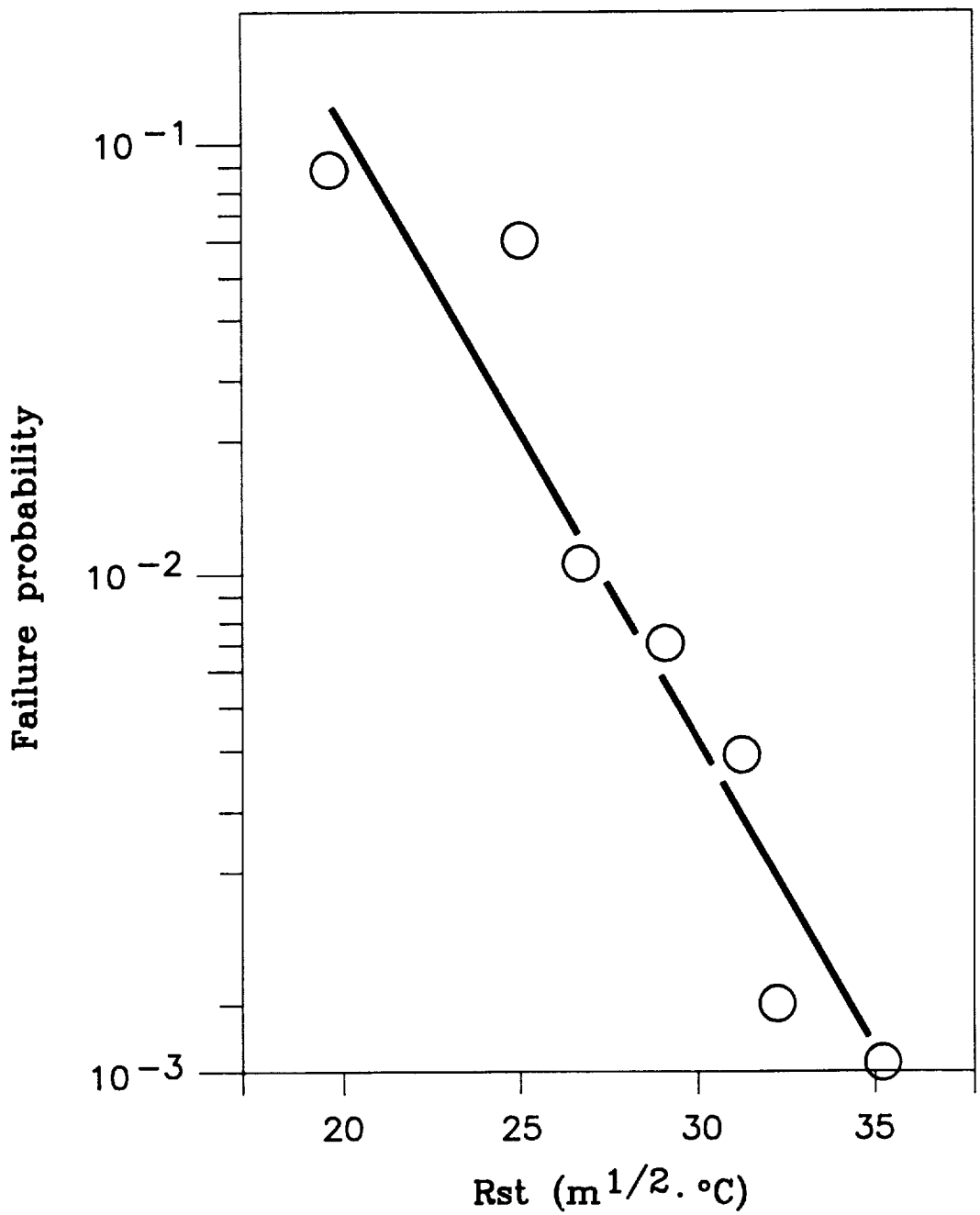
FIG. 3 is a graph which illustrates the relationship between the parameter $R_{st}$ and the probability of failure.

It can be seen from the $R_{st}$ values in Table 6 and the graph of FIG. 3 that the probability of failure for composite A is very low at about 1 tube in 1428 tubes while the probability of failure for composite B is much higher at about 1 tube in 100 tubes.

While the present invention has been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims:

What is claimed is:

1. A nozzle for pouring molten metal; said nozzle having an inner portion which forms a bore extending therethrough for the passage of molten metal through said nozzle wherein:
    at least part of said inner portion of said nozzle is formed of a refractory containing solids blend which consists essentially of doloma and graphite and said solids of said solids blend being bonded in a carbonized matrix wherein said graphite is present in an amount of more than 33 wt. % based on the weight of said solids blend.

2. The nozzle of claim 1 wherein the solids blend contains 37–66 wt. % of doloma based upon the weight of said solids blend.

3. The nozzle of claim 2 wherein the doloma has a density of at least 3.25 grams/cm$^3$.

4. The nozzle of claim 3 wherein the solids blend contains at least 35 wt. % of graphite based upon the weight of said solids blend.

5. The nozzle of claim 3 wherein the solids blend contains up to 45 wt. % of graphite based upon the weight of said solids blend.

6. The nozzle of claim 5 wherein the graphite is flake graphite.

7. The nozzle of claim 5 wherein the solids blend contains 35–45 wt. % of graphite based upon the weight of said solids blend.

8. The nozzle of claim 7 wherein the graphite is flake graphite.

9. The nozzle of claim 7 wherein the solids blend contains 35–43 wt. % of graphite based upon the weight of said solids blend.

10. The nozzle of claim 9 wherein the graphite is flake graphite.

11. The nozzle of claim 6 wherein the solids blend contains about 62 wt. % of doloma based upon the weight of said solids blend.

12. The nozzle of claim 10 wherein the solids blend contains about 38 wt. % of graphite based upon the weight of said solids blend.

13. The nozzle of claim 12 wherein the graphite is 0.044 mm to 0.3 mm in diameter and said doloma includes a ball mill fines fraction having a surface to weight ratio of 2300 cm$^2$/gm to 2800 cm$^2$/gm and a coarse fraction having a diameter of from 0.15 mm to 1.4 mm in diameter; said coarse fraction being in the range of 32–43 wt. % based upon the weight of said solids blend and said ball mill fines fraction being in the range of 20–25 wt. % based upon the weight of said solids blend.

14. The nozzle of claim 13 wherein the total doloma content of said solids blend is about 62 wt. %.

15. The nozzle of claim 14 wherein the amount of ball mill fines constitutes about 25 wt. % of the solids blend and the coarse fraction of doloma constitutes about 37 wt. % of the solids blend and said coarse fraction includes a first subfraction having a diameter of 0.15 mm to 1.4 mm and a second subfraction having a diameter of 0.15 mm to 0.42 mm; said first coarse subfraction being present in an amount of about 30 wt. % based upon the weight of said solids blend and said second subfraction being present in an amount of about 7 wt. % based upon the weight of said solids blend.

16. The nozzle of claim 15 wherein the graphite has a diameter of 0.15 mm to 0.3 mm.

17. The nozzle of claim 8 wherein the solids blend further includes an oxide selected from the group consisting of $SiO_2$, $ZrO_2$, $HfO_2$, $CeO_2$, $TiO_2$ and $MgO_2$; said oxide being present in an amount below 25 wt. % based upon the weight of said solids blend.

18. The nozzle of claim 8 wherein said solids blend further includes an antioxidant selected from the group consisting of aluminum, silicon, boron, calcium, magnesium, silicon carbide, calcium carbide, zirconium carbide, boron carbide, tantalum carbide and titanium carbide.

19. The nozzle of claim 8 which further includes an oxidation barrier layer to prevent ingress of oxygen into the carbonized matrix; said barrier layer comprising a low melting oxide selected from the group consisting of boric oxide and sodium borate and glass forming compounds selected from the group consisting of aluminum oxide, silicon oxide, boron oxide, phosphorous oxide, zirconium oxide, aluminum carbide, silicon carbide, boron carbide, phosphorous carbide and zirconium carbide.

20. The nozzle of claim 5 wherein the entire inner portion of said nozzle is formed from said refractory containing solids blend which is bonded in said carbonized matrix.

21. The nozzle of claim 10 wherein the whole of said nozzle is formed from said refractory containing solids blend which is bonded in said carbonized matrix.

22. A method for casting molten aluminum killed ferrous metal which comprises pouring said molten metal through a nozzle into a mold and then solidifying said metal wherein said nozzle has an inner portion which forms a bore extending therethrough for the passage of molten metal through said nozzle and wherein at least a part of said inner portion of said nozzle is formed of a refractory containing solids blend which consists essentially of doloma and graphite and said solids of said solids blend being bonded in a carbonized matrix; wherein said graphite is present in an amount of more than 33 wt. % based on the weight of said solids blend.

23. A method for pouring molten aluminum killed ferrous metal which comprises pouring said molten metal through a nozzle having an inner portion which forms a bore extending therethrough for the passage of molten metal through said nozzle wherein at least a part of said inner portion of said nozzle is formed of a refractory containing solids blend which consists essentially of doloma and graphite and said solids of said solids blend being bonded in a carbonized matrix; wherein said graphic is present in an amount of more than 33 wt. % based on the weight of said solids blend.

24. A nozzle for pouring molten metal; said nozzle having an inner portion which forms a bore extending therethrough for the passage of molten metal through said nozzle wherein:
    at least part of said inner portion of said nozzle is formed of a refractory containing solids blend which consists essentially of doloma and more than 33 wt. % of graphite based on the weight of said solids blend; said solids of said solids blend being bonded in a carbonized matrix;
    said carbonized matrix being formed by incorporating liquid resin and a curing agent for said resin, into said solids blend to form a solids blend-curable resin mixture; heating said mixture to cure said resin and then baking said mixture under carbonizing conditions to carbonize said resin; said liquid resin being phenol-formaldehyde resin dissolved in furfuraldehyde or a solution of furfuryl alcohol and furfuraldehyde.

25. A method for making a nozzle having a passage for pouring molten metal therethrough; said method comprising the steps of:

mixing a solids blend with liquid resin and curing agent for said resin to form an agglomerate; said solids blend consisting essentially of more than 33 wt. % of graphite and 37–66 wt. % of doloma having a density of at least 3.25 gm/cm$^3$; said liquid resin being phenol-formaldehyde resin dissolved in furfuraldehyde or a solution of furfuryl alcohol and furfuraldehyde;

pressing said agglomerate in a mold to form said agglomerate into the shape of a conduit having a passage extending therethrough;

baking said conduit to cure said resin and then baking said conduit under carbonizing conditions to carbonize said resin thereby forming a carbonized matrix which holds said solids blend together.

26. The method of claim 25 wherein said agglomerate is isostatically pressed in said mold at 8,500 psi to 25,000 psi whereby said conduit has a bulk density in the range of 2.35–2.45 grams/cubic centimeter and said conduit is baked under carbonizing conditions in the absence of oxygen at a temperature of 975° C.–1375° C.

27. The method of claim 26 wherein said solids blend contains at least 35 wt. % of graphite.

28. The method of claim 27 wherein said solids blend contains 35–45 wt. % of graphite.

29. The method of claim 28 wherein said graphite is flake graphite.

30. The method of claim 28 wherein said solids blend contains about 38 wt. % of graphite.

31. The nozzle formed by the method of claim 25.
32. The nozzle formed by the method of claim 26.
33. The nozzle formed by the method of claim 27.
34. The nozzle formed by the method of claim 28.
35. The nozzle formed by the method of claim 29.
36. The nozzle formed by the method of claim 30.

* * * * *

UNITED STATES PATENT AND TRADEMARK OFFICE
Certificate

Patent No. 5,885,520                                                                                    Patented: March 23, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Donald B. Hoover, York, PA; Colin Richmond, Yorkshire, United Kingdom; and Charles Frank Cooper, Worcestershire, United Kingdom.

Signed and Sealed this Twenty-fifth Day of March 2003.

ROY V. KING
*Supervisory Patent Examiner*
Art Unit 1742